US012636681B2

(12) United States Patent 
Sakaida

(10) Patent No.: US 12,636,681 B2 
(45) Date of Patent: May 26, 2026

(54) SORTING SYSTEM AND SORTING METHOD

(71) Applicant: DAIFUKU CO., LTD., Osaka (JP)

(72) Inventor: Semma Sakaida, Tokyo (JP)

(73) Assignee: DAIFUKU CO., LTD., Osaka (JP)

( * ) Notice: Subject to any disclaimer, the term of this patent is extended or adjusted under 35 U.S.C. 154(b) by 0 days.

(21) Appl. No.: 18/848,725

(22) PCT Filed: Jan. 24, 2024

(86) PCT No.: PCT/JP2024/001945 
§ 371 (c)(1), 
(2) Date: Sep. 19, 2024

(87) PCT Pub. No.: WO2024/176694 
PCT Pub. Date: Aug. 29, 2024

(65) Prior Publication Data 
US 2025/0196193 A1　Jun. 19, 2025

(30) Foreign Application Priority Data

Feb. 24, 2023　(JP) ................................. 2023-027729

(51) Int. Cl. 
*B07C 7/00* (2006.01) 
*B65G 1/137* (2006.01) 
*G06K 19/07* (2006.01)

(52) U.S. Cl. 
CPC .............. *B07C 7/005* (2013.01); *B65G 1/137* (2013.01); *G06K 19/0723* (2013.01)

(58) Field of Classification Search 
CPC .... B07C 7/005; B65G 1/137; G06Q 19/0723; G06Q 10/06315; G06Q 10/087; G06Q 30/0633 
See application file for complete search history.

(56) References Cited

U.S. PATENT DOCUMENTS

| | | | | |
|---|---|---|---|---|
| 7,769,221 B1 * | 8/2010 | Shakes | ................. | G06Q 10/087 |
| | | | | 705/28 |
| 2020/0261945 A1 * | 8/2020 | Nagafuchi | ............ | B07C 5/3412 |
| 2022/0198378 A1 | 6/2022 | Oka | | |

FOREIGN PATENT DOCUMENTS

| | | |
|---|---|---|
| JP | 2002-347911 | 12/2002 |
| JP | 2017-091402 | 5/2017 |
| JP | 2019-206409 | 12/2019 |
| JP | 2022-97102 | 6/2022 |

* cited by examiner

*Primary Examiner* — Michael McCullough 
*Assistant Examiner* — Kalyanavenkateshware Kumar 
(74) *Attorney, Agent, or Firm* — Casimir Jones, S.C.; Thomas J. Lyneis

(57) ABSTRACT

To enable an operator to recognize arrival of a sorting target article, even while the operator is away from an operation area. A first control section (12) of a control device (1) determines a sorting destination on the basis of identification information that has been read by a reading device (3), and causes a first wireless communication section (11) to transmit information on reception of an article to a mobile terminal (2) that is associated with the determined sorting destination. A second control section (22) of the mobile terminal (2) causes a notification section (24, 26, 27) to notify an arrival timing at which the article is to arrive at the sorting destination, on the basis of the information on the reception of the article which has been received by a second wireless communication section (21).

12 Claims, 7 Drawing Sheets

SORTING SYSTEM AND SORTING METHOD

TECHNICAL FIELD

The present invention relates to a sorting system and a sorting method.

BACKGROUND ART

Conventionally, in sorting lines that convey articles, such as a package, to operators, the operators have determined whether the articles are articles that the operators are to deal with (whether the articles are sorting targets) by visually reading labels attached to the articles. In addition, operators have been notified that sorting target articles have arrived by lighting of lumps in places in which the operators are positioned, when the sorting target articles have arrived. One technology related to this is the invention disclosed in Patent Literature 1.

Patent Literature 1 discloses that a terminal reads a slip number attached to a package and transmits the slip number to a server, followed by receiving delivery destination address data associated with the slip number from the server and determining whether or not the delivery destination address data is an address within delivery destination area information.

CITATION LIST

Patent Literature

Patent Literature 1
Japanese Patent Application Publication Tokukai No. 2017-091402

SUMMARY OF INVENTION

Technical Problem

In such a sorting line, the operator may move among the areas during operation. This raises a problem in that even when the lightning of the lump as described above notifies the operator that the sorting target article has arrived, the operator misses the lightening and cannot receive the article appropriately. Further, even use of the invention disclosed in Patent Literature 1 cannot solve such a problem.

It is an object of an aspect of the present invention to provide a technology that enables an operator to recognize arrival of a sorting target article, even while the operator is away from an operation area.

Solution to Problem

In order to solve the foregoing problem, a sorting system in accordance with an aspect of the present invention is a sorting system which is used in a sorting line for conveying an article and which includes a reading device configured to read identification information provided to the article, a control device, and a plurality of mobile terminals, the control device including: a storage section storing association information indicating which of the plurality of mobile terminals are associated with which of a plurality of sorting destinations each of which is a place in which the article is to be received; a first wireless communication section configured to wirelessly communicate with the plurality of mobile terminals; and a first control section configured to determine a sorting destination on the basis of the identification information that has been read by the reading device and to cause the first wireless communication section to transmit information on reception of the article to a mobile terminal that is associated with the determined sorting destination, each of the plurality of mobile terminals including: a second wireless communication section configured to wirelessly communicate with the control device; a notification section configured to carry out notification to an outside; and a second control section configured to cause the notification section to notify an arrival timing at which the article is to arrive at the determined sorting destination, on the basis of the information on the reception of the article, the information having been received by the second wireless communication section.

In order to solve the foregoing problem, a sorting method in accordance with an aspect of the present invention is a sorting method in a system which is used in a sorting line for conveying an article and which includes a reading device configured to read identification information provided to the article conveyed, a control device, and a plurality of mobile terminals, each of the plurality of mobile terminals being able to be associated with any one of plurality of sorting destinations each of which is a place in which the article is to be received, the method including the steps of: determining, by the control device, a sorting destination on the basis of the identification information that has been read by the reading device; transmitting, by the control device, information on reception of the article to a mobile terminal that is associated with the determined sorting destination; and notifying, by the mobile terminal, an outside of an arrival timing at which the article is to arrive at the determined sorting destination, on the basis of the information on the reception of the article, the information having been received by the mobile terminal.

Advantageous Effects of Invention

An aspect of the present invention enables an operator to recognize arrival of a sorting target article, even while the operator is away from an operation area.

DESCRIPTION OF EMBODIMENTS

<Overview of Sorting Line to which Sorting System 100 is Applied>

Figure 1:
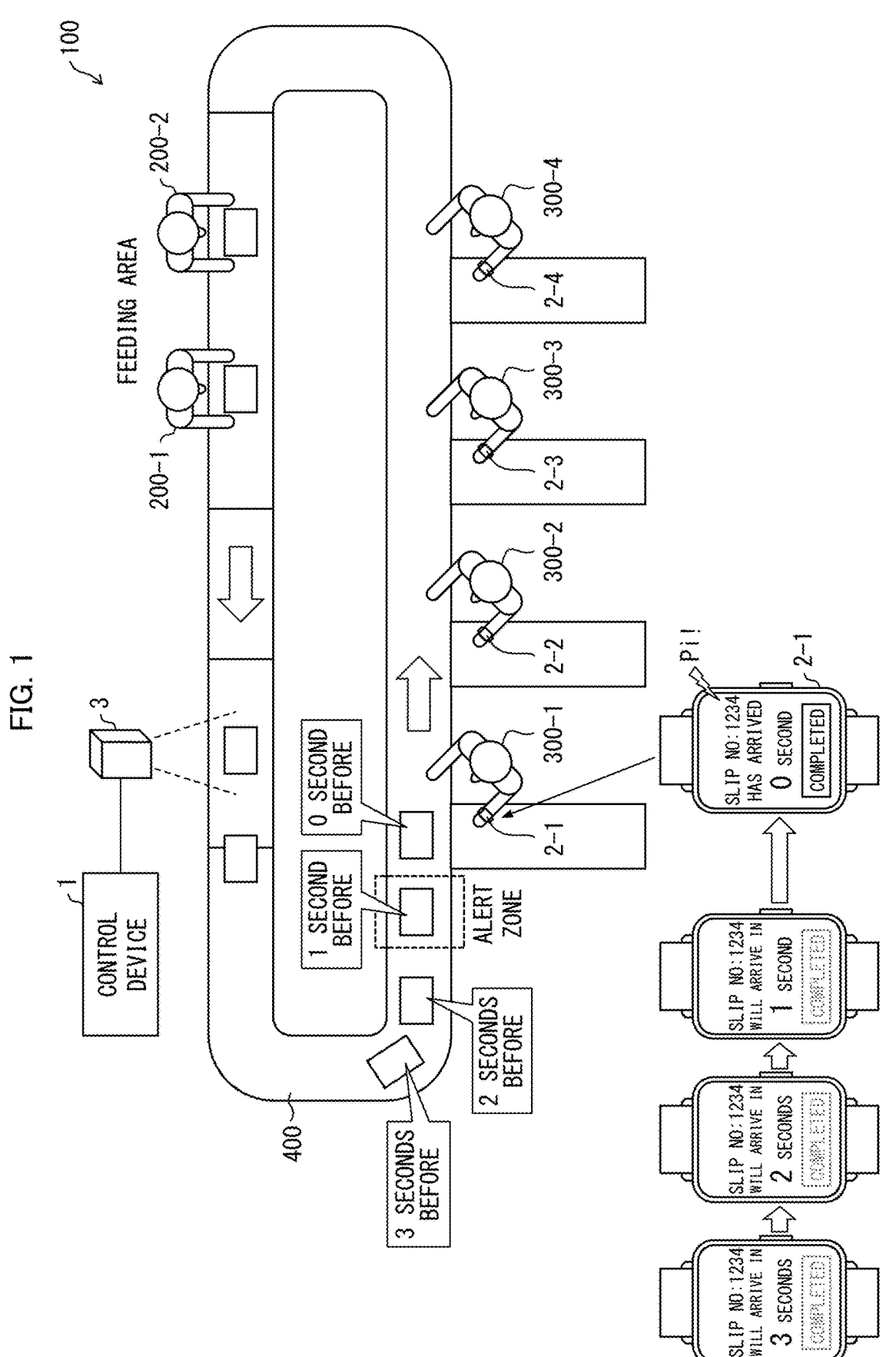
FIG. 1 is a view illustrating one example of a sorting line to which a sorting system in accordance with an embodiment of the present invention is applied.

FIG. 1 is a view illustrating one example of a sorting line to which a sorting system 100 in accordance with an embodiment of the present invention is applied. As illustrated in FIG. 1, operators 200-1 and 200-2 and operators 300-1 to 300-4, that is, the six operators in total are positioned along a belt conveyor 400 in the sorting line.

The two operators 200-1 and 200-2 are positioned in a feeding area and mainly carry out an operation of feeding articles onto the sorting line. The articles that are provided with identification information are placed onto the belt conveyor 400. On the basis of the identification information, sorting destinations where the articles are to be received are determined. The following description will discuss a case where an identification code is used as one example of the identification information. However, this should not be construed as a limitation. For example, the identification information may be information unique to the target articles, such as the colors and the shapes of the articles.

A control device 1 and a reading device 3 are provided immediately downstream of the feeding area. The reading device 3 reads an identification code provided to an article conveyed on the belt conveyor 400 and outputs information of the identification code read, to the control device 1.

Examples of the identification code include one-dimensional codes, such as a barcode, and two-dimensional codes, such as a quick response (QR) code or DataMatrix. However, the identification code only needs to be provided with information that enables the article to be identified, and is not limited to these.

The control device 1 determines sorting destinations where the articles are to be received, on the basis of the identification codes read by the reading device 3, and wirelessly transmits information on reception of the articles to mobile terminals associated with the sorting destinations. For example, the information on reception of the articles includes arrival times at which the articles are to arrive at the sorting destinations, the slip numbers of the articles, and the like. It is also possible that the information on reception of the articles includes various information on, for example, the shapes, the sizes, the colors, and the conditions of the articles, and an operator sorts the articles with reference to the various information.

The operators 300-1 to 300-4 are positioned in the sorting destinations where the articles are to be received. It is assumed that the operator 300-1 is positioned in a sorting destination 1, the operator 300-2 is positioned in a sorting destination 2, the operator 300-3 is positioned in a sorting destination 3, and the operator 300-4 is positioned in a sorting destination 4.

The operators 300-1 to 300-4 wear respective mobile terminals 2-1 to 2-4. The mobile terminal 2-1 worn by the operator 300-1 is associated with the sorting destination 1, the mobile terminal 2-2 worn by the operator 300-2 is associated with the sorting destination 2, the mobile terminal 2-3 worn by the operator 300-3 is associated with the sorting destination 3, and the mobile terminal 2-4 worn by the operator 300-4 is associated with the sorting destination 4. Note that each of the mobile terminals 2-1 to 2-4 is preferably a device that can be worn so as to enable the operator to carry out an operation by the both hands. Each of the mobile terminals 2-1 to 2-4 is, for example, a wearable device. Further, a smartwatch wearable at an arm of the operator is suitable.

When the control device 1 refers to the identification code read by the reading device 3 and determines that a place in which an article is to be received is, for example, the sorting destination 1, the control device 1 transmits, to the mobile terminal 2-1 associated with the sorting destination 1, an arrival time at which the article is to arrive at the sorting destination 1 and the slip number of the article.

When the mobile terminal 2-1 worn by the operator 300-1 receives, from the control device 1, the arrival time at which the article is to arrive at the sorting destination 1 and the slip number of the article, the mobile terminal 2-1 processes the information and displays the information on a display screen of the mobile terminal 2-1. For example, the mobile terminal 2-1 calculates the time that it takes for the article to arrive at the sorting destination 1 by comparing the arrival time of the article and the current time, and displays the calculated time in a countdown, as illustrated in FIG. 1. Further, the mobile terminal 2-1 displays, for example, the last four digits of the slip number provided to the article.

When the time displayed on the mobile terminal 2-1 which it takes for the article to arrive at the sorting destination 1 becomes "0", the operator 300-1 draws the arriving article to a chute and confirms that the last four digits of the slip number provided to the article agree with the last four digits of the slip number displayed on the mobile terminal 2-1. The operator 300-1 then carries out the subsequent operation.

For example, when the article arrives at an alert zone (place in which the article is located one second before the article arrives at the sorting destination 1) illustrated in FIG. 1, the mobile terminal 2-1 may carry out notification to the operator 300-1 by ringing a buzzing sound described later or may carry out notification to the operator 300-1 by vibrating a vibrator described later.

Even while the operator 300-1 is carrying out an operation in another place, as described above, the operator 300-1 can be notified of a timing at which the sorting target article arrives at the sorting destination 1, and therefore, the operator 300-1 can return to the sorting destination 1 and receive the article. Even if the operator 300-1 fails to receive the sorting target article, the article travels round on the belt conveyor 400 and returns to the same place, and the control device 1 carries out the notification again. The operator 300-1 thus only needs to take in the article then.

Configuration Example of Sorting System 100

Figure 2:
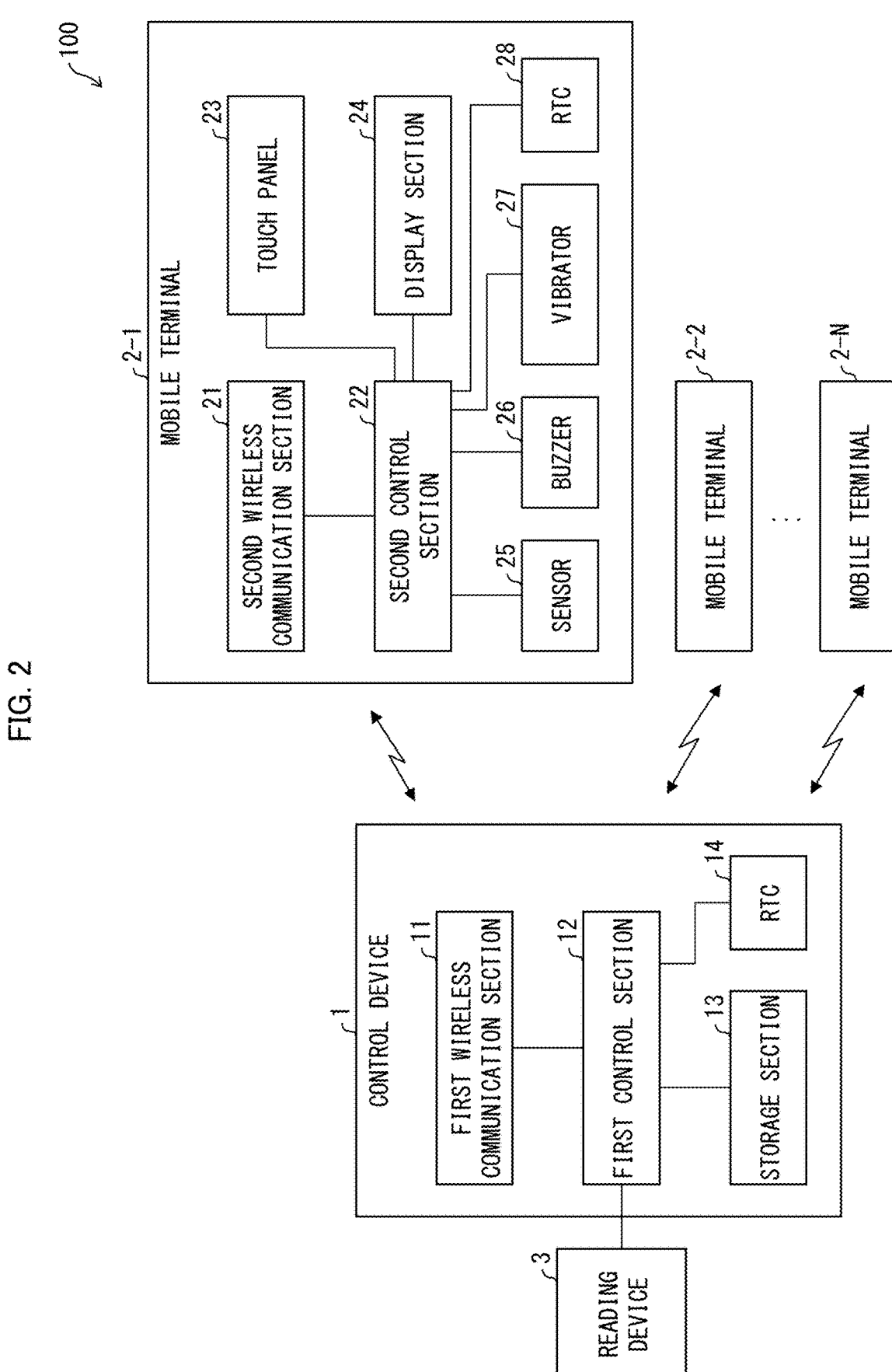
FIG. 2 is a block diagram illustrating one example of a schematic configuration of a sorting system in accordance with an embodiment of the present invention.

The following description will discuss a configuration of the sorting system 100 in accordance with an embodiment of the present invention with reference to the drawings. FIG. 2 is a block diagram illustrating an example of a schematic configuration of the sorting system 100 in accordance with an embodiment of the present invention. The sorting system 100 includes the control device 1, mobile terminals 2-1 to 2-N, and the reading device 3.

The control device 1 includes a first wireless communication section 11, a first control section 12, a storage section 13, and a real time clock (RTC) 14. The first wireless communication section 11 is a section configured to wirelessly communicate with the mobile terminals 2-1 to 2-N and can use, for example, a wireless local (LAN), Wi-Fi (registered trademark), Bluetooth (registered trademark), mobile data communication network, or the like.

The storage section 13 is made up of, for example, a random access memory (RAM), a hard disk drive (HDD), a flash memory, or a solid state drive (SSD), and stores association information indicating which of the plurality of mobile terminals 2-1 to 2-N are associated with which of the plurality of sorting destinations. Further, the storage section 13 stores the identification codes provided to the articles, the slip numbers of the articles, and the sorting destinations of the articles so that the identification codes correspond to the slip numbers and the sorting destinations.

Further, the storage section 13 stores respective times required for the articles to arrive at the plurality of sorting destination 1 to 4 thereof from when the identification codes provided to the articles had been read by the reading device 3. In addition, the storage section 13 counts and stores information related to activity records of the operators corresponding to the mobile terminals 2-1 to 2-N and health conditions of the operators.

The RTC 14 tracks time and outputs at least the current time to the first control section 12. The first control section 12 transmits the current time outputted from the RTC 14, to the mobile terminals 2-1 to 2-N via the first wireless communication section 11, thereby making it possible to synchronize the current time and the times of RTCs 28 contained in the mobile terminals 2-1 to 2-N.

When an identification code provided to an article which has been read by the reading device 3 is inputted into the first control section 12, the first control section 12 searches the storage section 13 to acquire the slip number of the article corresponding to the identification code and the sorting destination of the article. The first control section 12 then searches the association information stored in the storage section 13 to identify a mobile terminal that is associated with the sorting destination of the article.

For example, in a case where the sorting destination of the article is the sorting destination 1, the first control section 12 searches the storage section 13 to acquire the time required for the article to arrive at the sorting destination 1. The first control section 12 then adds the required time to the current time outputted from the RTC 14, to calculate the arrival time at which the article is to arrive at the sorting destination 1. Subsequently, the first control section 12 transmits the slip number of the article and the arrival time at which the article is to arrive at the sorting destination 1, to the mobile terminal 2-1 via the first wireless communication section 11.

When the first control section 12 receives, from any one of the mobile terminals 2-1 to 2-N, association information indicating which one of the plurality of sorting destinations the one mobile terminal is associated with, via the first wireless communication section 11, the first control section 12 updates the association information stored in the storage section 13.

In a case where the first control section 12 transmits the slip number of an article and an arrival time of the article to any one of the mobile terminals 2-1 to 2-N via the first wireless communication section 11 and then receives, from the one mobile terminal, a response indicating that the article has been received, the first control section 12 counts the activity record of the operator corresponding to the mobile terminal and stores the activity record in the storage section 13.

When the first control section 12 receives information related to a health condition of the operator from any one of the mobile terminals 2-1 to 2-N via the first wireless communication section 11, the first control section 12 stores the health condition of the operator in the storage section 13. The information related to the health condition of the operator may be information related to an operating time of the operator.

Each of the mobile terminals 2-1 to 2-N includes a second wireless communication section 21, a second control section 22, a touch panel 23, a display section 24, a sensor 25, a buzzer 26, a vibrator 27, and an RTC 28. Note that the display section 24, the buzzer 26, and the vibrator 27 are collectively referred to as a notification section. The notification section only needs to be a member that enables notification to the outside, and is not limited to these.

The second wireless communication section 21 is a section configured to wirelessly communicate with the control device 1 and can use, for example, a wireless LAN, Wi-Fi (registered trademark), Bluetooth (registered trademark), mobile data communication network, or the like.

The display section 24 is made up of, for example, a liquid crystal display panel. The touch panel 23 is provided on the display section 24 and functions as an input section that inputs information in accordance with the contents displayed on the display section 24.

The sensor 25 has a function of acquiring vital data related to a health condition of an operator using the corresponding one of the mobile terminals 2-1 to 2-N and is made up of, for example, a pulse sensor configured to measure a pulse of the operator, an oxygen level sensor configured to measure an oxygen level of the operator, or an acceleration sensor configured to measure a movement amount of the operator.

The buzzer 26 has a function of, for example, carrying out, to the operator, notification indicating that a sorting target article has been fed onto the sorting line, notification indicating that the article almost arrives at the sorting destination thereof, and notification indicating that the article has arrived at the sorting destination, with use of, for example, a buzzing sound.

The vibrator 27 has a function of, for example, carrying out, to the operator, notification indicating that a sorting target article has been fed onto the sorting line, notification indicating that the article almost arrives at the sorting destination thereof, and notification indicating that the article has arrived at the sorting destination, through vibration.

The RTC 28 tracks time and outputs at least the current time to the second control section 22. In a case where the second control section 22 receives the current time from the control device 1 via the second wireless communication section 21, the second control section 22 sets the current time for the RTC 28, thereby making it possible to synchronize the times of the RTC 28 and the RTC 14 contained in the control device 1.

The second control section 22 displays a menu screen on the display section 24 at activation of the mobile terminal 2, and, through the touch panel 23, inputs the contents of instruction that the operator has inputted by pressing the touch panel 23.

Figure 3:
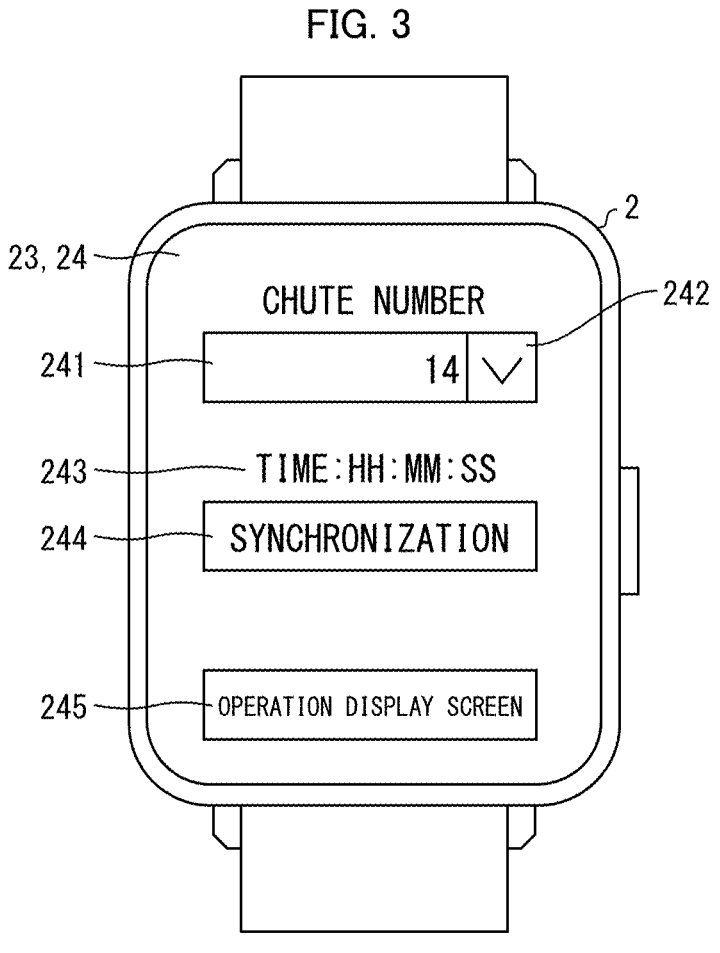
FIG. 3 is a view illustrating one example of a menu screen of a smartwatch, which is one example of each of mobile terminals in accordance with an embodiment of the present invention.

FIG. 3 is a view illustrating one example of a menu screen displayed on the mobile terminal 2. As illustrated in FIG. 3, the menu screen includes an area 241 displaying a chute number (number corresponding to a sorting destination), a switching button 242 for the chute number, an area 243 displaying the current time, a synchronization button 244 for synchronization with the time of the control device 1, and a transition button 245 to transition to an operation display screen.

The area 241 displays information indicating which one of the plurality of sorting destinations (chute numbers) the mobile terminal 2 is associated with. The sorting destination (chute number) associated with the mobile terminal 2 can be changed by the operator pressing the switching button 242. In a case where the operator has changed the sorting destination (chute number) associated with the mobile terminal 2, the second control section 22 transmits association information indicating which one of the plurality of sorting destinations the mobile terminal 2 is associated with, to the control device 1 via the second wireless communication section 21. The times of the control device 1 and the mobile terminal 2 are synchronized by the operator pressing the synchronization button 244. When the second control section 22 detects that the synchronization button 244 on the touch panel 23 has been pressed, the second control section 22 transmits a request for time synchronization to the control device 1 via the second wireless communication section 21.

When the control device 1 receives the request for time synchronization from the mobile terminal 2, the first control section 12 of the control device 1 transmits the current time outputted from the RTC 14, to the mobile terminal 2 via the first wireless communication section 11, thereby making it possible to synchronize the times of the RTC 14 and the RTC 28 contained in the mobile terminal 2, as described above.

When the operator has finished setting the mobile terminal 2, the operator presses the transition button (operation display screen) 245 to switch the contents displayed on the display section 24 to the operation display screen, and a sorting operation of the operator is started.

Figure 4:
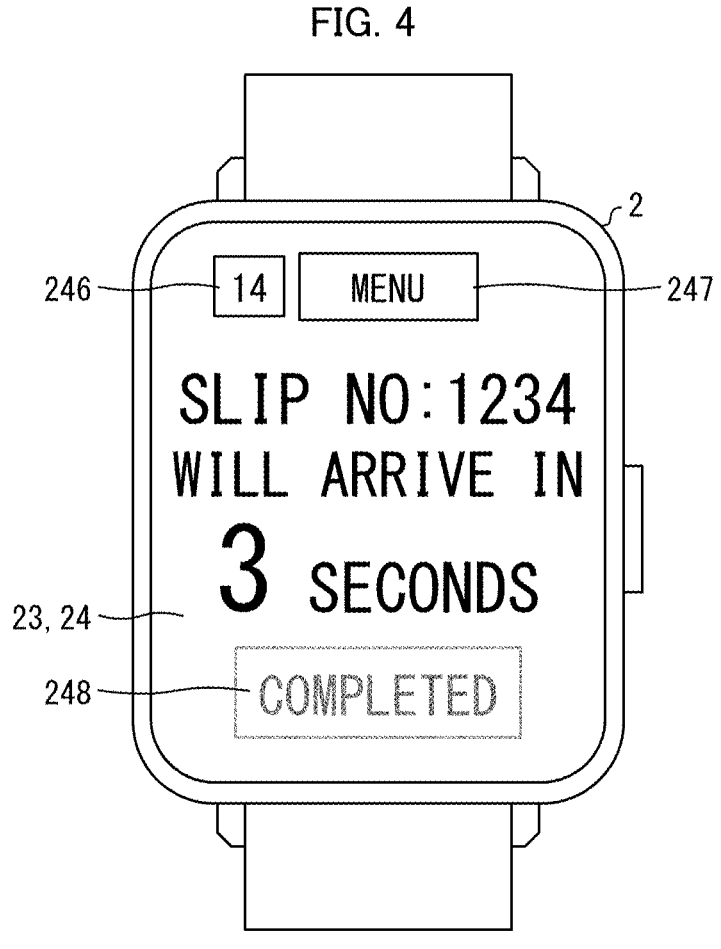
FIG. 4 is a (first) view illustrating one example of an operation display screen of a smartwatch, which is one example of each of mobile terminals in accordance with an embodiment of the present invention.
Figure 5:
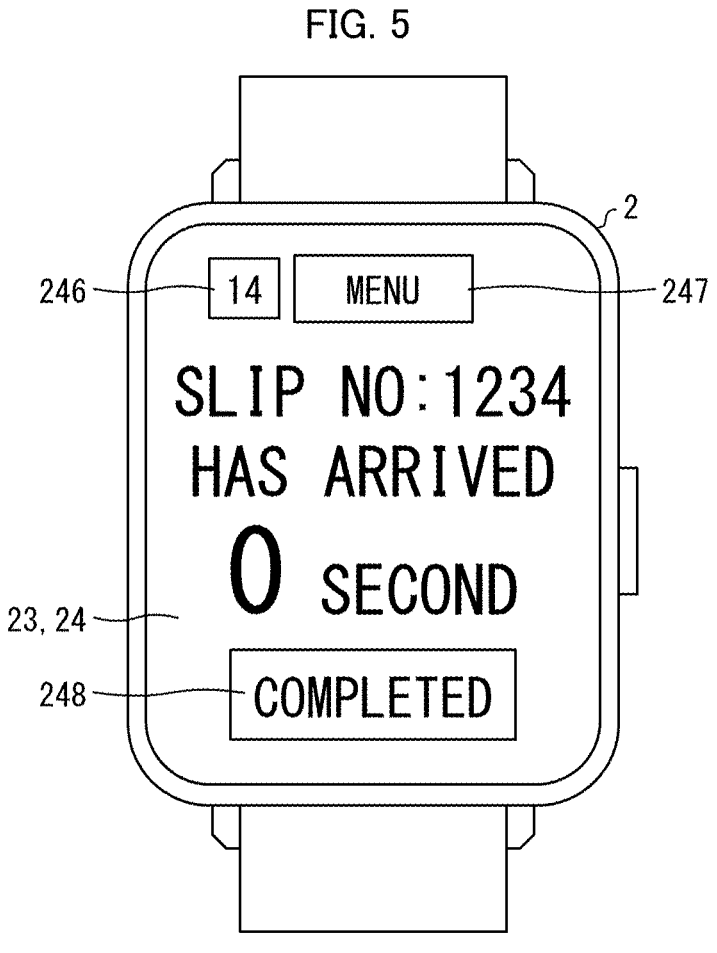
FIG. 5 is a (second) view illustrating one example of an operation display screen of a smartwatch, which is one example of each of mobile terminals in accordance with an embodiment of the present invention.
Figure 6:
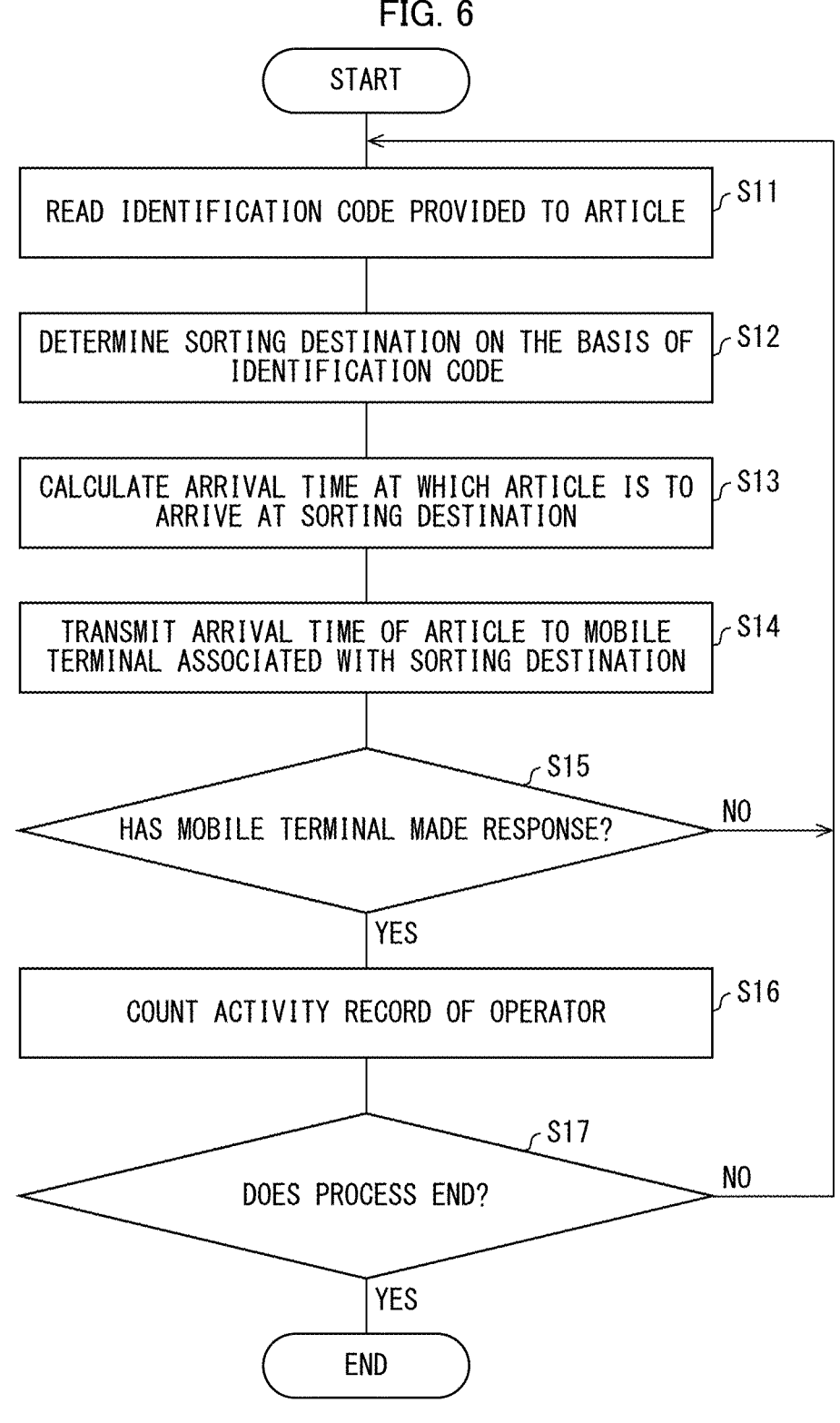
FIG. 6 is a flowchart for explaining a processing procedure of a control device in accordance with an embodiment of the present invention.
Figure 7:
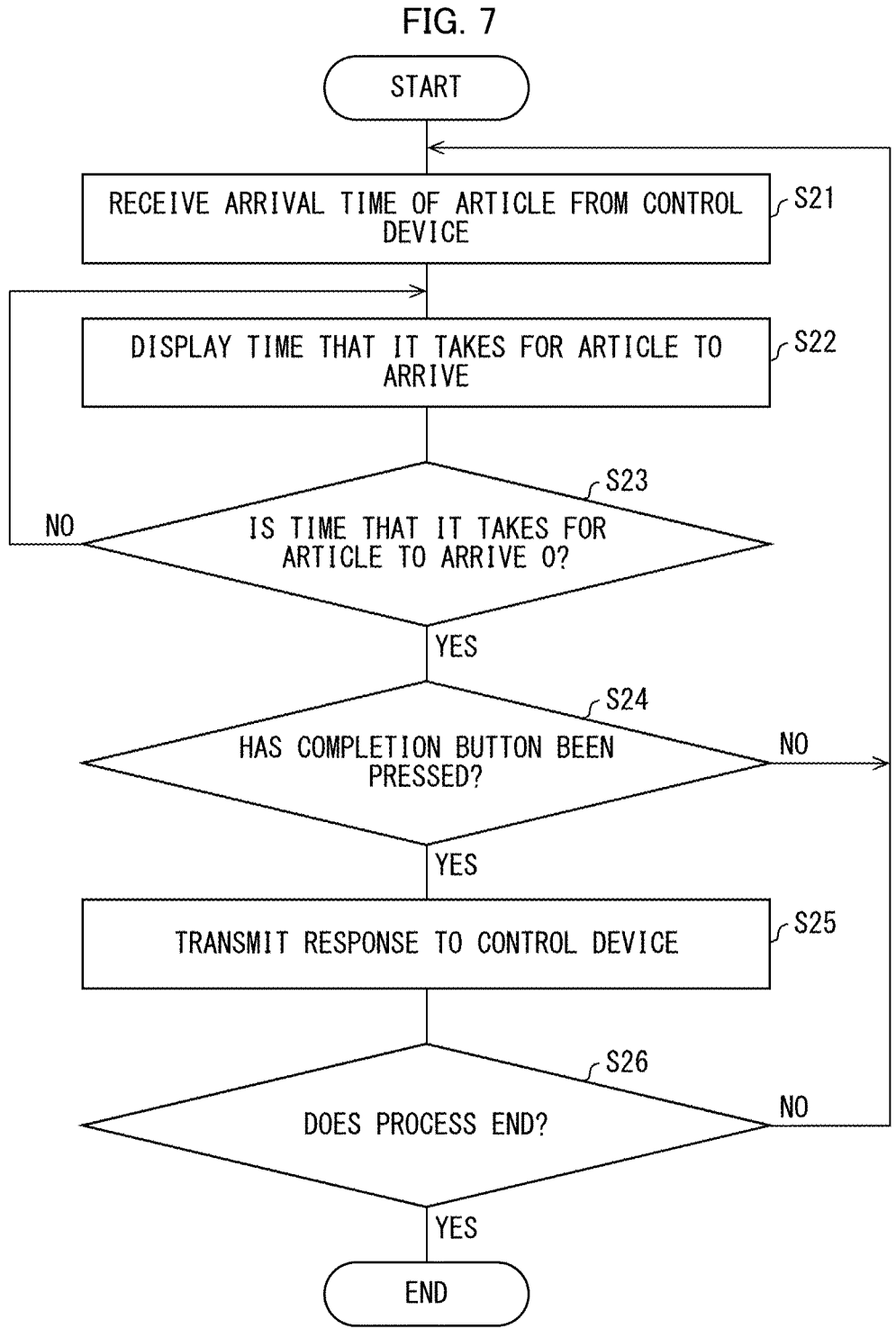
FIG. 7 is a flowchart for explaining a processing procedure of each of mobile terminals in accordance with an embodiment of the present invention.

FIG. 4 and FIG. 5 are each a view illustrating one example of the operation display screen of a smartwatch, which is one example of each of mobile terminals in accordance with an embodiment of the present invention. As illustrated in FIG. 4, the operation display screen displays a chute number displaying area 246, a menu button 247, and a completion button 248, and in a case where a sorting destination of an article agrees with the chute number displayed on the mobile terminal 2, the last four digits of the slip number and the time that it takes for the article to arrive are additionally displayed. In FIG. 4, it is shown that the last four digits of the slip number are "1234" and it takes three seconds for the article to arrive.

When the second control section 22 receives the slip number of the article and the arrival time at which the article is to arrive at the sorting destination, from the control device 1 via the second wireless communication section 21, the second control section 22 compares the arrival time of the article and the current time to calculate the time that it takes for the article to arrive at the sorting destination thereof, and displays the calculated time on the display section 24. In addition, the second control section 22 displays, on the operation display screen, the last four digits of the slip number provided to the article.

When the operator presses the menu button 247, the screen is switched to the menu screen illustrated in FIG. 3. When the operator presses the completion button 248, the second control section 22 detects that the completion button 248 has been pressed, and transmits a response notifying that the operator has finished receiving the article, to the control device 1 via the second wireless communication section 21.

When the article is conveyed on the belt conveyor 400 and arrives at the sorting destination, it is shown that it takes 0 second for the article to arrive, as illustrated in FIG. 5, thereby showing indication to prompt the operator to receive the article. When the operator receives the article, the operator presses the completion button 248 to notify the control device 1 that the operator has received the article.

<Processing Flow of Control Device 1>

It is a flowchart for explaining a processing procedure of the control device 1 in accordance with an embodiment of the present invention. First, the first control section 12 of the control device 1 reads an identification code provided to an article with use of the reading device 3 (S11).

The first control section 12 then searches the storage section 13 to acquire the slip number of the article and the sorting destination of the article which correspond to the identification code, and determines the sorting destination of the article (S12). Subsequently, the first control section 12 searches the storage section 13 to acquire the time required for the article to arrive at the sorting destination thereof and adds the required time to the current time outputted from the RTC 14, to calculate an arrival time at which the article is to arrive at the sorting destination (S13).

After that, the first control section 12 transmits the arrival time of the article and the slip number of the article to a mobile terminal 2 that is associated with the sorting destination (S14). The first control section 12 then determines whether or not the mobile terminal 2 has made a response (S15). When the mobile terminal 2 has not made a response (S15, No), the process returns to the step S11 and subsequent processes are repeated. Even if the operator fails to receive the sorting target article, the process of reading the identification code provided to the article and the subsequent processes are carried out again.

When the mobile terminal 2 has made a response (S15, Yes), the first control section 12 counts the activity record of the operator corresponding to the mobile terminal 2 and stores the activity record in the storage section 13 (S16). Lastly, it is determined whether or not the process ends (S17). In a case where the process does not end (S17, No), the process returns to the step S11 and the subsequent processes are repeated. In a case where the process ends (S17, Yes), the process ends accordingly.

<Processing Flow of Mobile Terminal 2>

First, the second control section 22 of a mobile terminal 2 receives an arrival time of an article and the slip number of the article from the control device 1 via the second wireless communication section 21 (S21). The second control section 22 then compares the arrival time of the article and the current time to calculate the time that it takes for the article to arrive at the sorting destination thereof, and displays the calculated time on the display section 24 while displaying the last four digits of the slip number of the article (S22).

Subsequently, the second control section 22 determines whether or not the time that it takes for the article to arrive is 0 (S23). When the time that it takes for the article to arrive is not 0 (S23, No), the process of the step S22 is repeated.

When the time that it takes for the article to arrive is 0, (S23, Yes) the second control section 22 determines whether or not the completion button 248 has been pressed (S24). When the completion button 248 has not been pressed (S24, No), the second control section 22 determines that the operator has not received the sorting target article, and the process returns to the step S21 and subsequent processes are repeated.

When the completion button 248 has been pressed (S24, Yes), the second control section 22 transmits a response to the control device 1 via the second wireless communication section 21 (S25). Lastly, it is determined whether or not the process ends (S26). In a case where the process does not end (S26, No), the process returns to the step S21 and subsequent processes are repeated. In a case where the process ends (S26, Yes), the process ends accordingly.

Variations

Note that it is also possible that the first control section 12 of the control device 1 causes the first wireless communication section 11 to transmit an arrival time at which an article is to arrive at the sorting destination thereof, and the second control section 22 of the mobile terminal 2 causes the display section 24 to display the arrival time of the article which has been received by the second wireless communication section 21 as it is.

In addition, it is also possible that the first control section 12 of the control device 1 generates an arrival time at which an article is to arrive at the sorting destination thereof, compares the arrival time and the current time, and causes the first wireless communication section 11 to sequentially transmit the time that it takes for the article to arrive at the sorting destination thereof, and the second control section 22 of the mobile terminal 2 causes the display section 24 to sequentially display the time that it takes for the article to arrive at the sorting destination.

<Effects of Sorting System 100>

As described above, according to the sorting system 100 in accordance with the present embodiment, the second control section 22 of each mobile terminal 2 causes the notification section thereof to notify an arrival timing at which an article is to arrive at the sorting destination thereof, on the basis of information on reception of the article which has been received by the second wireless communication section 21. This enables an operator to recognize arrival of a sorting target article, even while the operator is away from an operation area.

The second control section 22 of each mobile terminal 2 compares an arrival time and the current time and causes the display section 24 to sequentially display the time that it takes for an article to arrive at the sorting destination thereof. This enables an operator to easily know a timing at which the article arrives.

The second control section 22 of each mobile terminal 2 causes the display section 24 to display the arrival time received by the second wireless communication section 21. This enables an operator to easily know a timing at which an article arrives by comparing the arrival time displayed on the display section 24 and the current time.

The first control section 12 of the control device 1 generates an arrival time at which an article is to arrive at the sorting destination, compares the arrival time and the current time, and causes the first wireless communication section 11 to sequentially transmit the time that it takes for the article to arrive at the sorting destination thereof. This eliminates the need for the mobile terminal 2 to calculate the time that it takes for the article to arrive at the sorting destination thereof.

When the first control section 12 of the control device 1 receives a response via the first wireless communication section 11, the first control section 12 counts the activity record of the operator corresponding to a mobile terminal 2 that has transmitted the response. This enables collective management of activity records of the operators.

When association information is inputted into the second control section 22 of a mobile terminal 2 through the touch panel 23, the second control section 22 causes the second wireless communication section 21 to transmit the association information. When the association information is received by the first control section 12 of the control device 1 via the first wireless communication section 11, the first control section 12 updates the association information stored in the storage section 13. This enables collective management of which of the plurality of mobile terminals are associated with which of the plurality of sorting destinations.

The second control section 22 of each mobile terminal 2 causes the second wireless communication section 21 to transmit information related to a health condition of the operator which has been acquired by the sensor 25. This enables the control device 1 to collectively manage information related to health conditions of the operators.

Software Implementation Example

The control blocks (in particular, the first control section 12 and the second control sections 22) of the control device 1 and the mobile terminals 2 may be implemented by a logic circuit (hardware) provided in an integrated circuit (IC chip) or the like or can be alternatively implemented by software.

In the latter case, the first control section 12 and the second control sections 22 each include a computer that executes instructions of a program that is software implementing the foregoing functions. The computer, for example, includes at least one processor and at least one computer-readable storage medium storing the program. An object of the present invention can be achieved by the processor of the computer reading and executing the program stored in the storage medium. Examples of the processor can encompass a central processing unit (CPU). Examples of the storage medium can encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

Aspects of the present invention can also be expressed as follows:

A sorting system in accordance with Aspect 1 of the present invention is a sorting system which is used in a sorting line for conveying an article and which includes a reading device configured to read identification information provided to the article, a control device, and a plurality of mobile terminals, the control device including:

a storage section storing association information indicating which of the plurality of mobile terminals are associated with which of a plurality of sorting destinations each of which is a place in which the article is to be received;

a first wireless communication section configured to wirelessly communicate with the plurality of mobile terminals; and a first control section configured to determine a sorting destination on the basis of the identification information that has been read by the reading device and to cause the first wireless communication section to transmit information on reception of the article to a mobile terminal that is associated with the determined sorting destination, each of the plurality of mobile terminals including:

a second wireless communication section configured to wirelessly communicate with the control device;

a notification section configured to carry out notification to an outside; and a second control section configured to cause the notification section to notify an arrival timing at which the article is to arrive at the determined sorting destination, on the basis of the information on the reception of the article, the information having been received by the second wireless communication section.

The above configuration enables an operator to recognize arrival of a sorting target article, even while the operator is away from an operation area.

A sorting system in accordance with Aspect 2 of the present invention is the sorting system in accordance with Aspect 1 that is configured such that:

the notification section is a display section;

the first control section causes the first wireless communication section to transmit, as the information on the reception of the article, an arrival time at which the article is to arrive at the determined sorting destination; and the second control section compares the arrival time and a current time and causes the display section to sequentially display time that it takes for the article to arrive at the determined sorting destination.

The above configuration enables an operator to easily know a timing at which the article arrives.

A sorting system in accordance with Aspect 3 of the present invention is the sorting system in accordance with Aspect 1 that is configured such that:

the notification section is a display section;

the first control section causes the first wireless communication section to transmit, as the information on the reception of the article, an arrival time at which the article is to arrive at the determined sorting destination; and the second control section causes the display section to display the arrival time which has been received by the second wireless communication section.

The above configuration enables an operator to easily know a timing at which an article arrives by comparing the arrival time displayed on the display section and the current time.

A sorting system in accordance with Aspect 4 of the present invention is the sorting system in accordance with Aspect 1 that is configured such that:

the notification section is a display section;

the first control section generates an arrival time at which the article is to arrive at the determined sorting destination, compares the arrival time and a current time, and causes the first wireless communication section to sequentially transmit, as the information on the reception of the article, time that it takes for the article to arrive at the determined sorting destination; and the second control section causes the display section to sequentially display the time that it takes for the article to arrive at the determined sorting destination.

The above configuration eliminates the need for each mobile terminal to calculate the time that it takes for the article to arrive at the sorting destination thereof.

A sorting system in accordance with Aspect 5 of the present invention is the sorting system in accordance with Aspect 1 that is configured such that:

the notification section is a buzzer; and the second control section causes the buzzer to carry out notification at the arrival timing at which the article is to arrive at the determined sorting destination.

A sorting system in accordance with Aspect 6 of the present invention is the sorting system in accordance with Aspect 1 that is configured such that:

the notification section is a vibrator; and the second control section causes the vibrator to vibrate at the arrival timing at which the article is to arrive at the determined sorting destination.

A sorting system in accordance with Aspect 7 of the present invention is the sorting system in accordance with any one of Aspects 1 to 6 that is configured such that:

each of the plurality of mobile terminals further includes an input section configured to input completion of reception of the article;

when the completion of the reception of the article is inputted into the second control section by the input section, the second control section causes the second wireless communication section to transmit a response; and when the first control section receives the response via the first wireless communication section, the first control section counts an activity record of an operator corresponding to a mobile terminal that has transmitted the response.

The above configuration enables the control device to collectively manage information on activity records of the operators.

A sorting system in accordance with Aspect 8 of the present invention is the sorting system in accordance with any one of Aspects 1 to 7 that is configured such that:

each of the plurality of mobile terminals further includes an input section configured to input association information indicating which one of the plurality of sorting destinations the mobile terminal itself is associated with;

when the association information is inputted into the second control section by the input section, the second control section causes the second wireless communication section to transmit the association information; and when the first control section receives the association information via the first wireless communication section, the first control section updates the association information stored in the storage section.

The above configuration enables collective management of which of the plurality of mobile terminals are associated with which of the plurality of sorting destinations.

A sorting system in accordance with Aspect 9 of the present invention is the sorting system in accordance with any one of Aspects 1 to 8 that is configured such that:

each of the plurality of mobile terminals further includes a sensor configured to acquire information related to a health condition of an operator using the mobile terminal itself; and the second control section causes the second wireless communication section to transmit the information related to the health condition of the operator, the information having been acquired by the sensor.

The above configuration enables the control device to collectively manage information related to health conditions of the operators.

A sorting system in accordance with Aspect 10 of the present invention is the sorting system in accordance with any one of Aspects 1 to 9 that is configured such that each of the plurality of mobile terminals is a wearable device.

A sorting system in accordance with Aspect 11 of the present invention is the sorting system in accordance with Aspect 10 that is configured such that each of the plurality of mobile terminals is a smartwatch.

A sorting method in accordance with Aspect 12 of the present invention is a sorting method in a system which is used in a sorting line for conveying an article and which includes a reading device configured to read identification information provided to the article conveyed, a control device, and a plurality of mobile terminals, each of the plurality of mobile terminals being able to be associated with any one of plurality of sorting destinations each of which is a place in which the article is to be received, the method including the steps of:

determining, by the control device, a sorting destination on the basis of the identification information that has been read by the reading device;

transmitting, by the control device, information on reception of the article to a mobile terminal that is associated with the determined sorting destination; and notifying, by the mobile terminal, an outside of an arrival timing at which the article is to arrive at the determined sorting destination, on the basis of the information on the reception of the article, the information having been received by the mobile terminal.

The above configuration enables an operator to recognize arrival of a sorting target article, even while the operator is away from an operation area.

Additional Remarks

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Control device
2, 2-1 to 2-N Mobile terminal
3 Reading device
11 First wireless communication section
12 First control section
13 Storage section
14, 28 RTC
21 Second wireless communication section
22 Second control section
23 Touch panel
24 Display section
25 Sensor
26 Buzzer
27 Vibrator
100 Sorting system

The invention claimed is:

1. A sorting system which is used in a sorting line for conveying an article and which includes a reading device configured to read identification information provided to the article, a control device, and a plurality of mobile terminals, the control device comprising:

a storage section storing association information indicating which of the plurality of mobile terminals are associated with which of a plurality of sorting destinations each of which is a place in which the article is to be received;

a first wireless communication section configured to wirelessly communicate with the plurality of mobile terminals; and a first control section configured to determine a sorting destination on the basis of the identification information that has been read by the reading device and to cause the first wireless communication section to transmit information on reception of the article to a mobile terminal that is associated with the determined sorting destination, each of the plurality of mobile terminals comprising:

a second wireless communication section configured to wirelessly communicate with the control device;

a notification section configured to carry out notification to an operator; and a second control section configured to cause the notification section to notify, before arrival of the article at the determined sorting destination, an arrival timing at which the article is to arrive at the determined sorting destination, on the basis of the information on the reception of the article, the information having been received by the second wireless communication section.

2. The sorting system according to claim 1, wherein:

the notification section is a display section;

the first control section causes the first wireless communication section to transmit, as the information on the reception of the article, an arrival time at which the article is to arrive at the determined sorting destination; and the second control section causes the display section to display the arrival time which has been received by the second wireless communication section.

3. The sorting system according to claim 1, wherein:

the notification section is a display section;

the first control section generates an arrival time at which the article is to arrive at the determined sorting destination, compares the arrival time and a current time, and causes the first wireless communication section to sequentially transmit, as the information on the reception of the article, time that it takes for the article to arrive at the determined sorting destination; and the second control section causes the display section to sequentially display the time that it takes for the article to arrive at the determined sorting destination.

4. The sorting system according to claim 1, wherein:

the notification section is a buzzer; and the second control section causes the buzzer to carry out notification before the arrival timing at which the article is to arrive at the determined sorting destination.

5. The sorting system according to claim 1, wherein:

the notification section is a vibrator; and the second control section causes the vibrator to vibrate before the arrival timing at which the article is to arrive at the determined sorting destination.

6. The sorting system according to claim 1, wherein:

each of the plurality of mobile terminals further comprises an input section configured to input completion of reception of the article;

when the completion of the reception of the article is inputted into the second control section by the input section, the second control section causes the second wireless communication section to transmit a response; and when the first control section receives the response via the first wireless communication section, the first control section counts an activity record of an operator corresponding to a mobile terminal that has transmitted the response.

7. The sorting system according to claim 1, wherein:

each of the plurality of mobile terminals further comprises an input section configured to input association information indicating which one of the plurality of sorting destinations the mobile terminal itself is associated with;

when the association information is inputted into the second control section by the input section, the second control section causes the second wireless communication section to transmit the association information; and when the first control section receives the association information via the first wireless communication section, the first control section updates the association information stored in the storage section.

8. The sorting system according to claim 1, wherein;

each of the plurality of mobile terminals further comprises a sensor configured to acquire information related to a health condition of an operator using the mobile terminal itself; and the second control section causes the second wireless communication section to transmit the information related to the health condition of the operator, the information having been acquired by the sensor.

9. The sorting system according to claim 1, wherein each of the plurality of mobile terminals is a wearable device.

10. The sorting system according to claim 9, wherein each of the plurality of mobile terminals is a smartwatch.

11. A sorting system which is used in a sorting line for conveying an article and which includes a reading device configured to read identification information provided to the article, a control device, and a plurality of mobile terminals, the control device comprising:

a storage section storing association information indicating which of the plurality of mobile terminals are associated with which of a plurality of sorting destinations each of which is a place in which the article is to be received;

a first wireless communication section configured to wirelessly communicate with the plurality of mobile terminals; and a first control section configured to determine a sorting destination on the basis of the identification information that has been read by the reading device and to cause the first wireless communication section to transmit information on reception of the article to a mobile terminal that is associated with the determined sorting destination, each of the plurality of mobile terminals comprising:

a second wireless communication section configured to wirelessly communicate with the control device;

a notification section configured to carry out notification to an outside; and a second control section configured to cause the notification section to notify an arrival timing at which the article is to arrive at the determined sorting destination, on the basis of the information on the reception of the article, the information having been received by the second wireless communication section;

wherein, the notification section is a display section;

the first control section causes the first wireless communication section to transmit, as the information on the reception of the article, an arrival time at which the article is to arrive at the determined sorting destination; and the second control section compares the arrival time and a current time and causes the display section to sequentially display time that it takes for the article to arrive at the determined sorting destination.

12. A sorting method in a system which is used in a sorting line for conveying an article and which includes a reading device configured to read identification information provided to the article conveyed, a control device, and a plurality of mobile terminals, each of the plurality of mobile terminals being able to be associated with any one of plurality of sorting destinations each of which is a place in which the article is to be received, the method comprising the steps of:

determining, by the control device, a sorting destination on the basis of the identification information that has been read by the reading device;

transmitting, by the control device, information on reception of the article to a mobile terminal that is associated with the determined sorting destination; and notifying, by the mobile terminal, before arrival of the article at the determined sorting destination, an operator of an arrival timing at which the article is to arrive at the determined sorting destination, on the basis of the information on the reception of the article, the information having been received by the mobile terminal.

\* \* \* \* \*